US009486868B2

(12) United States Patent
Micali et al.

(10) Patent No.: US 9,486,868 B2
(45) Date of Patent: Nov. 8, 2016

(54) DEVICE FOR ADJUSTING CUTTING DEPTH FOR REMOVAL OF WELD BEADS INSIDE PROFILE SECTIONS SUCH AS TUBES AND THE LIKE

(71) Applicant: FIVES OTO S.P.A., Boretto (IT)

(72) Inventors: Luciano Micali, Guastalla (IT);
Andrea Anesi, S. Ilario D'Enza (IT);
Gianluca Alberini, Guastalla (IT);
Aleardo Chezzi, Boretto (IT)

(73) Assignee: FIVES OTO S.P.A., Boretto (IT)

( * ) Notice: Subject to any disclaimer, the term of this patent is extended or adjusted under 35 U.S.C. 154(b) by 185 days.

(21) Appl. No.: 14/563,417

(22) Filed: Dec. 8, 2014

(65) Prior Publication Data
US 2015/0190873 A1 Jul. 9, 2015

(30) Foreign Application Priority Data
Jan. 9, 2014 (IT) ................................. MO14A0004

(51) Int. Cl.
*B23D 79/02* (2006.01)
*B21C 37/08* (2006.01)
(Continued)

(52) U.S. Cl.
CPC ......... *B23D 79/023* (2013.01); *B21C 37/0811* (2013.01); *B23D 1/003* (2013.01);
(Continued)

(58) Field of Classification Search
CPC ............ Y10T 409/501804; Y10T 409/50164; Y10T 409/501476; Y10T 409/503116; B23D 79/023; B23D 79/021; B23D 1/003; B23D 1/08; B23D 1/10; B23D 1/24; B23D 1/26; B26D 3/001
See application file for complete search history.

(56) References Cited

U.S. PATENT DOCUMENTS

| 2,237,550 A | * | 4/1941 | Darner | B23D 79/023 |
| | | | | 29/33 A |
| 2,900,879 A | * | 8/1959 | Norton | B21C 37/0811 |
| | | | | 409/299 |

(Continued)

FOREIGN PATENT DOCUMENTS

| JP | 56062709 A | * | 5/1981 |
| JP | S61109614 U | | 7/1986 |

(Continued)

OTHER PUBLICATIONS

JP 63-172514 English Translation.*

*Primary Examiner* — Daniel Howell
*Assistant Examiner* — Yasir Diab
(74) *Attorney, Agent, or Firm* — Pearne & Gordon LLP

(57) ABSTRACT

A device for adjusting cutting depth for the removal of weld beads inside profile sections such as tubes and the like, comprising a supporting frame (1) of an elongated shape and transverse dimensions suitable for enabling it to be contained inside a profile section or tube (2), the supporting frame (1) being associated, at one end thereof, with an arm or external rod, the device being characterized in that it comprises: —a plurality of rolling elements (3) associated with the supporting frame (1) at a pre-established mutual distance in a longitudinal direction and that partially project out from the body of the same supporting frame and are capable of coming into contact with the inner surface of the profile section or tube (2) in a zone that is diametrically opposite the one whereon the internal weld bead (4) lies; —at least two rollers (5), which are idle, arranged longitudinally at a pre-established distance from each other, and mounted on small frames (6) that are movable in transverse directions with respect to the longitudinal axis of the supporting frame (1) from an active position, wherein the rollers (5) are in contact with the inner surface of the profile section or tube (2) in the proximity of the internal weld bead (4), to an inactive position, wherein the rollers (5) are not in contact with this inner surface of the profile section or tube (2).
The rollers being commanded to shift transversely by a control mechanism having inclined surfaces (7).

11 Claims, 3 Drawing Sheets

(51) Int. Cl.
  *B23D 1/08* (2006.01)
  *B23D 1/10* (2006.01)
  *B23D 1/26* (2006.01)
  *B26D 3/00* (2006.01)
  *B23D 1/00* (2006.01)
  *B23D 1/24* (2006.01)

(52) U.S. Cl.
  CPC .................. *B23D 1/08* (2013.01); *B23D 1/10* (2013.01); *B23D 1/24* (2013.01); *B23D 1/26* (2013.01); *B23D 79/021* (2013.01); *B26D 3/001* (2013.01); *Y10T 409/50164* (2015.01); *Y10T 409/501476* (2015.01); *Y10T 409/501804* (2015.01)

(56) References Cited

U.S. PATENT DOCUMENTS

| | | | | |
|---|---|---|---|---|
| 2,923,208 A | * | 2/1960 | Hotchkiss | B23D 79/023 407/13 |
| 3,783,722 A | * | 1/1974 | Bosworth | B23D 79/023 409/299 |
| 3,819,898 A | * | 6/1974 | Boston | B23D 79/023 219/61.12 |
| 3,834,275 A | * | 9/1974 | Newland | B23D 1/08 29/33 D |
| 4,358,231 A | * | 11/1982 | Meier | B23D 79/023 409/299 |
| 4,440,533 A | * | 4/1984 | Gotting | B23D 79/023 409/299 |
| 4,682,921 A | * | 7/1987 | Blaho | B23D 79/023 29/33 D |
| 4,710,078 A | * | 12/1987 | Altmeyer | B23D 79/023 407/113 |
| 5,056,972 A | * | 10/1991 | Burwell | B23D 79/023 407/114 |
| 5,216,792 A | | 6/1993 | Engler et al. | |

FOREIGN PATENT DOCUMENTS

| | | |
|---|---|---|
| JP | S61192409 A | 8/1986 |
| JP | S62105712 | 7/1987 |
| JP | S63172514 | 11/1988 |
| JP | H10337609 A | 12/1998 |
| JP | H1133814 A | 2/1999 |
| JP | 2002018633 A | 1/2002 |
| WO | 8809231 A1 | 12/1988 |

* cited by examiner

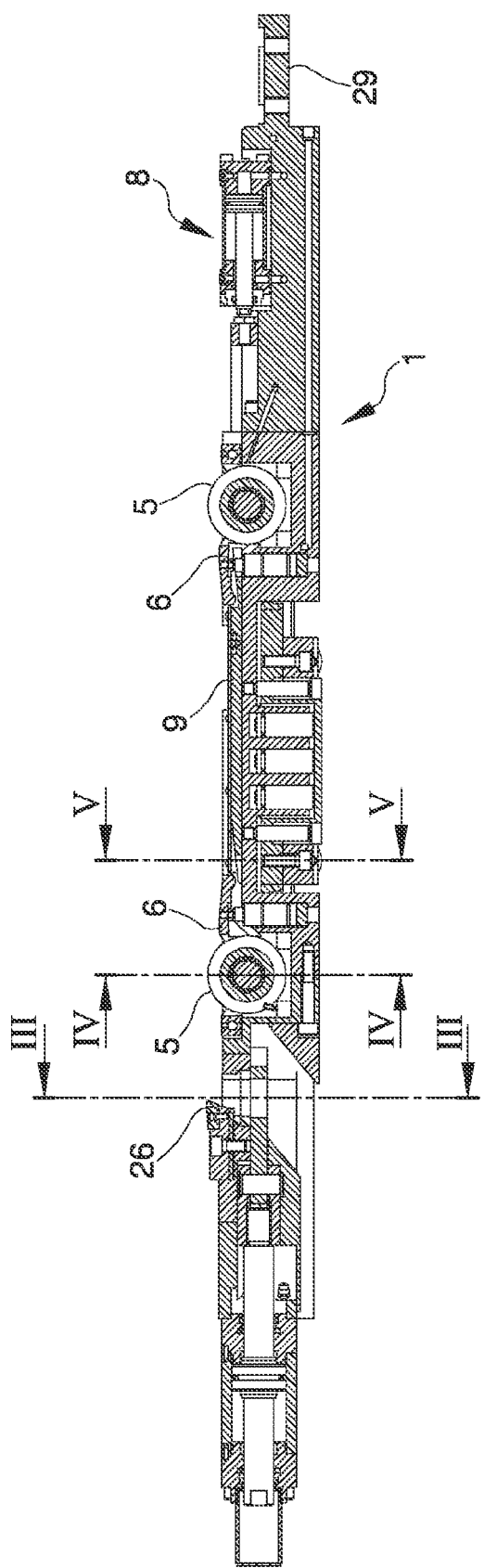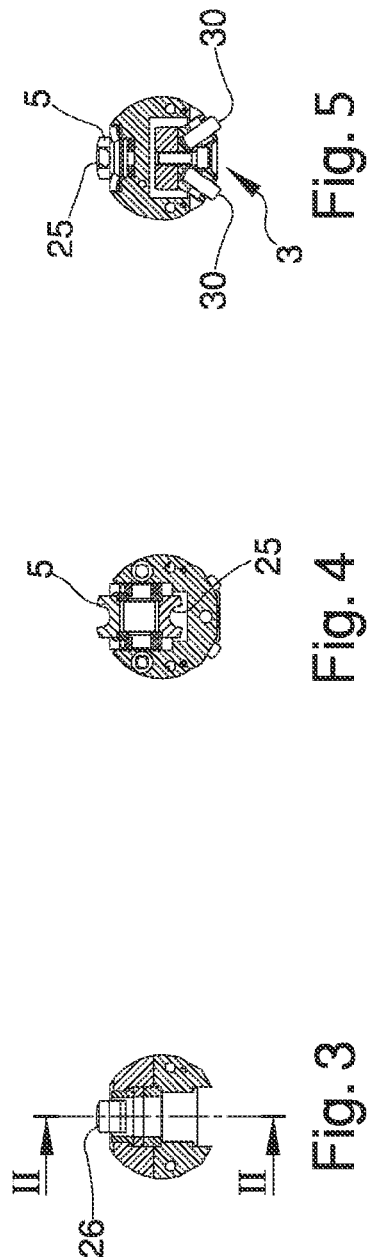

DEVICE FOR ADJUSTING CUTTING DEPTH FOR REMOVAL OF WELD BEADS INSIDE PROFILE SECTIONS SUCH AS TUBES AND THE LIKE

The present invention relates to an adjusting device of a cutting depth for removal of weld beads inside profile sections.

Especially though not exclusively the invention is applicable for removing weld beads, usually known as debeading, which beads are present internally of closed-section profile elements. In particular the invention is useful for debeading internally of tubes obtained by welding. Generally the weld beads are predisposed longitudinally internally of tubes obtained by welding.

In these tubes the closed profile is, for the purpose of information, completed by means of a continuous welding of the two flaps, reciprocally-facing following a forming operation realized by plastic deformation starting from a flat continuous strip. The welding gives rise to a weld bead on both the external side and the inner side of the profile section.

The removal or debeading of the internal weld bead is realized, according to the prior art, by bead remover tools which are dimensioned and predisposed so as to be introduced and to slide internally of the tube.

There are some considerable problems involved in carrying out an operation of this type. Among these problems there is a relevant one, for example, relating to the eliminating of the swarf produced. The prior art offers various solutions to this problem, such as for example the object of U.S. Pat. No. 5,216,792 in which the internal debeading is carried out by simple action of a debeading tool, the position of which with respect to the internal surface of the tube during the carrying-out of the operation is substantially determined by the action and the arrangement of the cutting forces.

In the specific case of the present invention, the main drawback to be overcome relates to keeping under control the depth of the cut of the internal bead remover tool with the aim of ensuring a qualitative constancy in the carrying-out of the operation, between a replacement and another of the tool due to wear or for programmed maintenance.

It is therefore a foremost aim of the present invention to provide a device able to realise an adequate adjustment of the depth of cut of the internal bead remover tool; and continuously so during the carrying-out of the work cycle.

A further aim of the invention is to be able to command, from the outside, the adjustment using a device that is simple to manufacture and also simple to activate.

A further aim is to provide a device that is structurally configured such as to operate without drawbacks and in safety in severe working conditions due to temperature, etc.

This aim and others besides are attained by the present invention as it is identified in the claims and the description, together with the accompanying claims.

Among the advantages of the invention, one certainly not insignificant is that it enables a more accurate control of the work cycle, enabling interventions during work.

Further aims and advantages attained by the present invention will be more fully described in the description of a preferred but not exclusive embodiment illustrated in the appended figures, in which:

FIG. 2 shows an axial section, performed along the same axial plane as in FIG. 1, indicated with trace line II-II of FIG. 2, representing an overall view of the tool in a constructional form thereof;

Figure 6:
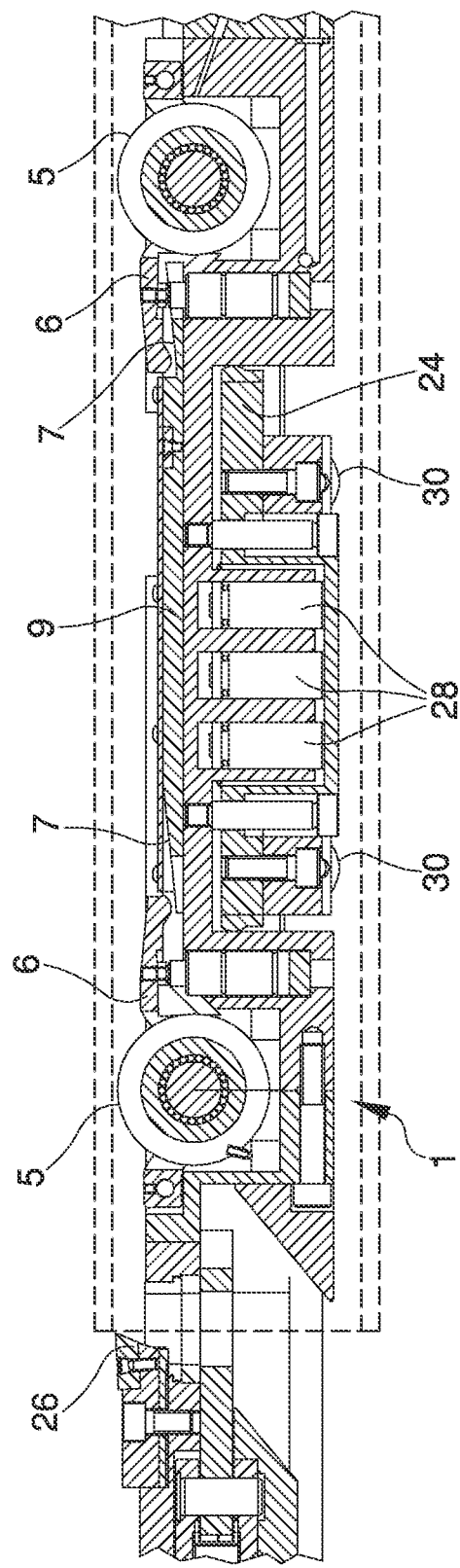

FIGS. 3, 4 and 5 respectively show the sections obtained with trace lines III-III, IV-IV and V-V of FIG. 2;

FIG. 6 show a view in larger scale of a central portion of FIG. 2.

With reference to the above-mentioned figures, 1 denotes in its entirety a supporting frame of a tool for removing an internal weld bead 4 of a closed-section profile element constituted in the example by a tube 2 obtained by welding. This tool is specifically structured for enabling adjustment of the cutting depth of a bead remover 26 usable for the removal of said weld bead 4 internally of the tube 2, which operation is commonly known as debeading.

The supporting frame 1 has an elongated shape and exhibits, together with the parts associated thereto, transverse dimensions enabling it to be contained internally of the tube 2. The supporting frame 1 is associated, at an end 29 thereof, to an arm or rod, not illustrated in the accompanying figures, which projects from the open end of the tube 2 and is fixed externally thereof.

A plurality of rolling elements 3 is constrained to the lower part of said supporting frame 1, which rolling elements 3 are located at a pre-established mutual distance in a longitudinal direction. The rolling elements 3 partially project from the body of the supporting frame 1 and are predisposed to come into contact with the internal surface of the tube 2 in a diametrically-opposite zone to a zone whereon the internal weld bead 4 lies.

At least two idle rollers 5 are predisposed superiorly of the supporting frame 1, which rollers 5 are arranged longitudinally at a pre-established distance from one another and are mounted on small frames or levers 6 that are mobile in a transverse direction with respect to the longitudinal axis of the supporting frame 1 so as to be positionable in any position comprised from at least an active position, at which the rollers 5 are in contact with the inner surface of the tube 2 in proximity of the internal weld bead 4, to at least an inactive position, at which the rollers 5 are not in contact with the inner surface of the tube 2.

The idle rollers 5 are arranged longitudinally, i.e. parallel to the longitudinal axis of the device, at a pre-established distance from one another on a same axial plane and exhibit an external rolling surface thereof profiled with a central groove 25 dimensioned so as to house the said internal weld bead 4 internally thereof.

The wheels 5 are commanded to carry out the transverse displacements thereof by command of a command mechanism having inclined surfaces 7.

Said command mechanism having inclined surfaces 7 is activated by a hydraulic linear actuator 8.

The inclined surfaces 7 exhibit an identical inclination to the longitudinal axis of the supporting frame 1 and are solidly constrained on slides 9 which are longitudinally slidable with respect to the body of the supporting frame 1 and mechanically connected, by a stem 10, to the piston 11 of the hydraulic linear actuator 8 so that a longitudinal displacement of both the inclined surfaces 7 produces a transverse displacement of the rollers 5 in the same direction.

The rollers 5 are in fact rotatably mounted on small frames 6 or levers which at an end thereof are pivoted on posts 31 fixed to the supporting frame 1, while on the other end thereof they are predisposed to interact in contact with the respective inclined surfaces 7. In this way an axial displacement of the inclined surfaces 7 produces a rotation by a same entity, but in an opposite direction, of the small frames 6 or levers which in turn generates identical transverse displacements of the wheels 5.

Figure 1:
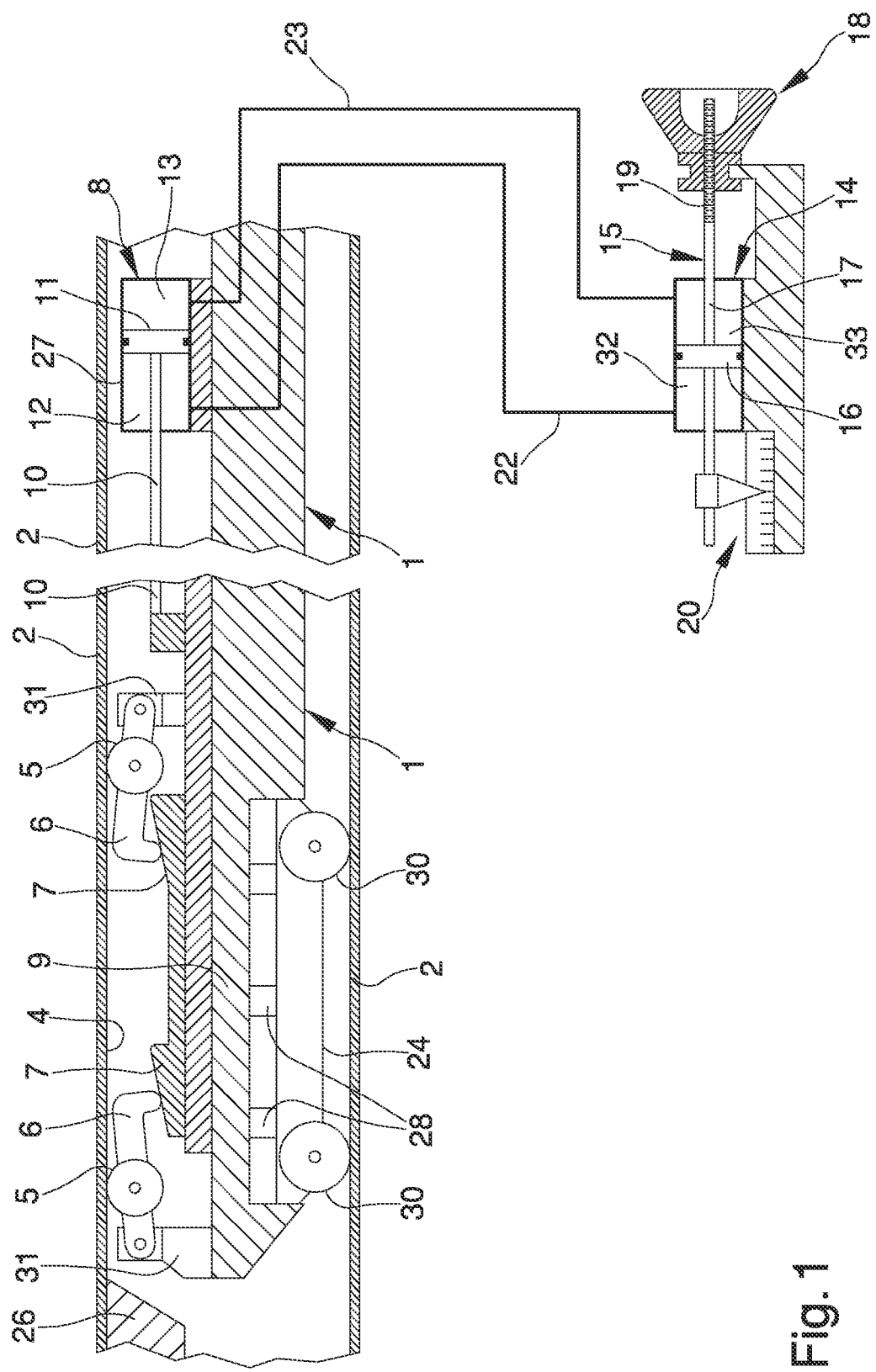
FIG. 1 shows a schematic view, using portions of sections made according to an axial plane in which some details are highlighted purely schematically.

The piston 11 divides the internal volume of the cylinder 27 of the hydraulic linear actuator 8 into two manoeuvring chambers 12 and 13 which are connected in a like manner by means of hydraulic conduits 22 and 23, only schematically represented in FIG. 1, to two corresponding command chambers 32 and 33 of an external hydraulic command cylinder 14, which is part of an external control console 15 and is provided with a control piston 16.

The control piston 16 is provided with at least a control rod 17 on an end of which, external of the hydraulic control cylinder 14, an operative adjustment knob 18 operates for enabling realization of the axial displacement in the two directions of the control rod 17 and the control piston 16 connected thereto with respect to the hydraulic control cylinder 14.

The adjustment knob 18 is axially constrained and is coupled to the said end of the control rod 17 by means of a coupling comprising an operating screw 19.

The whole hydraulic circuit connecting the manoeuvring chambers 12 and 13 with the corresponding control chambers 32 and 33 is closed.

The two control chambers 32 and 33 of the hydraulic control cylinder 14 can be, as for example is represented in the illustrated embodiment, exactly corresponding in terms of dimensions and capacity to the two manoeuvring chambers 12 and 13 of the hydraulic linear actuator 8. The dimensions and capacities of the control chambers 32 and 33 are also different to the dimensions and capacities of the manoeuvring chambers 12 and 13. This enables realizing a greater or smaller control sensitivity.

For example, with the control chambers 32 and 33 having smaller dimensions and capacities than those of the corresponding control chamber 12 and 13, in order to realize a determined displacement of the piston (11) it will be necessary to operate a greater displacement of the control piston 16. Therefore a finer adjustment of the axial displacement of the inclined surfaces 7 can be made, and therefore the rollers 5 can exploit a greater sensitivity of adjustment i.e. greater axial displacements of the control piston 16.

An indicator 20 is solidly connected to the control rod 17 of the control piston 16, which indicator 20 operates on a fixed graduated scale 21 so as to indicate the displacements of the control piston 16 and consequently the axial displacements of the piston 11 commanding the transverse displacements of the rollers 5.

The plurality of rolling elements 3 comprises two pairs of small idle rollers 30 mounted on a mobile frame 24; the small idle rollers 30 of each pair is flanked and arranged with relative axes that are not parallel to one another and lying on a transverse plane to the axis of the supporting frame 1.

The mobile frame 24 is constrained to undergo guided displacements in a transverse direction with respect to the supporting frame 1 by action of contrast means 28. This enables the whole tool to rest with the idle rollers 30 on the internal surface of the tube 2 in a diametrically-opposite position to the position against which the rollers 5 go to operate, thus realizing an adequate contrast. The contrast means 28 can be hydraulically-activated, pneumatically-activated or even elastic, by means of springs.

At least a bead remover tool 26 is solidly fixed to the supporting frame 1 on the same axial plane in which the rollers 5 are contained.

The assembly constituted by the rolling elements 3, located in the lower part of the supporting frame 1, and the rollers 5 is located, in an axial direction, in an opposite position to the cutting edge of the bead remover tool 26 with respect to an ideal plane perpendicular to the longitudinal axis of the supporting frame 1 and tangential to said cutting edge.

In the operation of the invention, in the initial step the rollers 5 are in a pre-established position. Once the welder is activated, which fuses the edges of the tube that are flanked to one another, the contrast elements 28 are activated to work on the mobile frame 24, transversely distancing from the body of the device and operating the descent up to when the rolling elements 3 arrive in contact with the lower zone of the internal surface of the tube 2. In this way a sort of expansion occurs which proceeds up to when all the rolling elements 3 and the rollers 5 are solidly in contact with the respective zones of the internal surface of the tube 2.

In this position, via the hydraulic control cylinder 14 the hydraulic linear actuator 8 is actuated to produce the transverse displacement of the rollers 5, thus adjusting the relative position with respect thereto of the bead remover tool 26 and, consequently, the depth of the cut.

In the above-mentioned active configuration, i.e. with the tool in the work position, as schematically represented in FIG. 1, by actuating the hydraulic linear actuator 8, the inclined surfaces 7 slide on the slides 9 and interact with the small frames or levers (6), causing a raising of the wheels 5.

By simply acting on the hydraulic control cylinder 14 it is thus possible to adjust and regulate the work position of the bead remover tool with respect to the tube 2 and to the internal weld bead 4. The displacements of the piston 16 translate, by effect of the hydraulic connection between the hydraulic control cylinder 14 and the cylinder of the linear actuator 8 and the consequent action exerted by the inclined surfaces 7 on the rollers 5, into a displacement of the rollers 5 that is transverse with respect to the axis of the tube 2.

This displacement is determined proportionally to the displacement induced by the control piston 16.

The adjusting of the cutting depth is in fact essentially determined by the radial distance with respect to the axis of the tube 2 which is realised between the cutting of the tool 26 and the rolling surfaces of the rollers 5.

The small idle rollers 30 act in opposition, contributing to maintaining the centred position of the tool with respect to the tube element 2.

The eventual insertion between the rod (not illustrated) and the supporting frame 1 of sensors able to measure the longitudinal component of the traction force or the variations in acceleration during the carrying-out of the debeading operations can enable obtaining a signalling of possible faults and thus correcting them by acting on the adjustment on the basis of the invention.

The invention claimed is:

1. A device for adjusting cutting depth for the removal of weld beads inside tubular sections, comprising a supporting frame (1) of an elongated shape and transverse dimensions suitable for enabling it to be contained inside a section (2), the supporting frame (1) being associated, at one end thereof, with an arm or external rod, the device being characterized in that it comprises:

a plurality of rolling elements (3) associated with said supporting frame (1) at a pre-established mutual distance in a longitudinal direction and that partially project out from the body of the same supporting frame and are capable of coming into contact with the inner surface of the section or tube (2) in a zone that is diametrically opposite the one whereon the internal weld bead (4) lies;

at least two rollers (5), which are idle, arranged longitudinally at a pre-established distance from each other, and mounted on small frames (6) that are movable in transverse directions with respect to the longitudinal axis of the supporting frame (1) from an active position, wherein the rollers (5) are in contact with the inner surface of the section or tube (2) in the proximity of the internal weld bead (4), to an inactive position, wherein the rollers (5) are not in contact with this inner surface of the section or tube (2), said rollers being commanded to shift transversely by a control mechanism having inclined surfaces (7).

2. The device for adjusting cutting depth according to claim 1, characterized in that said control mechanism having inclined surfaces (7) is activated by a hydraulic linear actuator (8).

3. The device for adjusting cutting depth according to claim 2, characterized in that said inclined surfaces (7) have the same inclination with respect to the longitudinal axis of the supporting frame (1) and are solidly constrained to slides (9), which are longitudinally slidable with respect to the body of the supporting frame (1) and mechanically connected to the piston (11) of the hydraulic linear actuator (8) by means of a stem (10).

4. The device for adjusting cutting depth according to claim 1, characterized in that the at least two rollers (5) are idle, longitudinally arranged at a pre-established distance from each other on the same axial plane and the external rolling surface thereof is shaped with a central groove (25) that is dimensioned so as to house said internal weld bead (4) therein.

5. The device for adjusting cutting depth according to claim 4, characterized in that the rollers (5) are mounted rotatably on small frames or levers (6), which, with a first end thereof, are pivoted on posts (31) fixed to the supporting frame (1), whereas the other end thereof is free and predisposed to interact in contact with the respective inclined surfaces (7); said rollers (5) can be positioned in any position ranging between an active position, wherein the rollers (5) are in contact with the inner surface of the tube (2) in the proximity of the internal weld bead (4), and at least one inactive position, wherein the rollers (5) are not in contact with this inner surface of the tube (2).

6. The device for adjusting cutting depth according to claim 3, characterized in that the piston (11) divides the internal volume of the cylinder of the hydraulic linear actuator (8) into two manoeuvring chambers (12) and (13), which are connected in a like manner, by means of hydraulic conduits (22) and (23) to two corresponding control chambers (32) and (33) of a hydraulic control cylinder (14), which is part of a control console (15) and is equipped with a control piston (16); the control piston (16) being equipped with at least one control rod (17) and on one end thereof, outside of the hydraulic cylinder (14), there is an operative adjustment knob (18) suitable for enabling axial shifting of the control rod (17) and the control piston (16) connected to it, in the two directions with respect to the hydraulic control cylinder (14).

7. The device for adjusting cutting depth according to claim 6, characterized in that the adjustment knob (18) is axially constrained and coupled to said end of the control rod (17) by means of coupling comprising an operating screw (19).

8. The device for adjusting cutting depth according to claim 7, characterized in that the entire hydraulic circuit connecting the manoeuvring chambers (12) and (13) with the corresponding control chambers (32) and (33) is closed.

9. The device for adjusting cutting depth according to claim 8, characterized in that an indicator (20) is solidly connected to the rod (17) of the control piston (16) and said indicator (20) operates on a fixed graduated scale (21) so as to indicate the shifting of the control piston (14).

10. The device for adjusting cutting depth according to claim 1, characterized in that said plurality of rolling elements (3) comprises two pairs of small idle rollers (30) mounted on a movable frame (24); the small idle wheels (30) in each pair are side by side and arranged with axes that are not parallel to each other and lying on a plane transverse to the axis of the supporting frame (1), said movable frame (24) being constrained so as to undergo guided shifting, by means of contrast elements (28), in a transverse direction with respect to the supporting frame (1).

11. The device for adjusting cutting depth according to claim 1, characterized in that it comprises at least one bead remover tool (26); the overall device being constituted by the plurality of rolling elements (3), which are placed in the lower part of said supporting frame (1), and said rollers (5), being located, in an axial direction, in a position opposite the cutting edge of the tool (26) with respect to an ideal plane perpendicular to the longitudinal axis of the supporting frame (1) and tangent to said cutting edge.

* * * * *